(12) United States Patent
Kokuzawa et al.

(10) Patent No.: US 7,567,381 B2
(45) Date of Patent: Jul. 28, 2009

(54) PLASTIC SHEET

(75) Inventors: Yukio Kokuzawa, Kanagawa (JP); Katsuyuki Murai, Kanagawa (JP); Shinpei Arita, Tochigi (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 533 days.

(21) Appl. No.: 11/305,108

(22) Filed: Dec. 19, 2005

(65) Prior Publication Data

US 2006/0134434 A1  Jun. 22, 2006

(30) Foreign Application Priority Data

Dec. 20, 2004  (JP) ............................. 2004-367361

(51) Int. Cl.
*G03B 21/60* (2006.01)
(52) U.S. Cl. ................ 359/452; 359/453; 359/454; 359/455; 359/456; 359/457; 362/355; 428/412
(58) Field of Classification Search ......... 359/452–457; 362/355
See application file for complete search history.

(56) References Cited

U.S. PATENT DOCUMENTS

| 6,271,965 | B1 * | 8/2001 | Miyata | 359/453 |
| 6,760,155 | B2 * | 7/2004 | Murayama et al. | 359/453 |
| 7,408,707 | B2 * | 8/2008 | Yeo et al. | 359/452 |
| 2002/0001055 | A1 * | 1/2002 | Kimura et al. | 349/112 |
| 2004/0257650 | A1 * | 12/2004 | Parusel et al. | 359/453 |
| 2004/0263966 | A1 * | 12/2004 | Momose et al. | 359/453 |
| 2006/0018015 | A2 * | 1/2006 | Parusel et al. | 359/453 |
| 2006/0039066 | A1 * | 2/2006 | Abe et al. | 359/457 |

\* cited by examiner

*Primary Examiner*—Callie E Shosho
*Assistant Examiner*—John Freeman
(74) *Attorney, Agent, or Firm*—Antonelli, Terry, Stout & Kraus, LLP.

(57) ABSTRACT

A highly diffusing plastic sheet having a thickness of from 1 to 5 mm, a haze of 80% or more and a total light transmittance of 80% or more, which includes at least one diffuser layer A, two or more diffuser layers B, and optionally a diffusing agent-free layer C. The diffuser layer A is formed from a first matrix plastic and a first light-diffusing fine particle having an average particle size of from 2 to 6 μm and a refractive index of from X−0.02 to X+0.02 wherein X is a refractive index of the first matrix plastic. The diffuser layer B is formed from a second matrix plastic and a second light-diffusing fine particle having an average particle size of from 10 to 18 μm and a refractive index of from Y−0.03 to Y+0.03 wherein Y is a refractive index of the second matrix plastic.

14 Claims, 2 Drawing Sheets

PLASTIC SHEET

BACKGROUND OF THE INVENTION

1. Field of the Invention

The present invention relates to highly diffusing plastic sheets which are utilized, for example, in the production of lenticular lens sheets of rear projection television.

2. Description of the Prior Art

In the field of recent rear projection television technique, a light source having a small projection pupil utilizing liquid crystal and digital micromirror device (DMD) as the means for displaying projected images has come to be used. In the rear projection television utilizing such a light source having a small projection pupil, the quality of images tends to be deteriorated by scintillation. The scintillation is also called speckle or flicker and is caused when the diffusion of the light from a small light source is insufficient. To prevent the scintillation, it has been considered effective to incorporate a light-diffusing fine particle into a Fresnel lens sheet or a lenticular lens sheet which constitutes the screen of rear projection television. JP-A-55-12980 proposes to minimize the difference between the refractive indices of light-diffusing fine particle and matrix, while increasing the density of light-diffusing fine particle per unit area by reducing its particle size. Japanese Patent No. 2933248 proposes to regulate the hazes of a Fresnel lens sheet and a lenticular lens sheet, a parallel light transmittance and a half angle α within specific ranges. JP-A-10-246916 proposes to uniformly disperse a spherical crystalline high polymer in a transparent resin in an amount of 0.01 to 30% by weight.

SUMMARY OF THE INVENTION

An object of the present invention is to provide highly diffusing plastic sheets capable of reducing the occurrence of scintillation more efficiently than ever.

The inventors have found that a plastic sheet having two or more specific diffuser layers drastically enhances the diffusing effect, makes it possible to obtain a high gain, and reduces the occurrence of scintillation.

Thus, the present invention provides a plastic sheet having a thickness of from 1 to 5 mm, a haze of 80% or more and a total light transmittance of 80% or more, which includes at least one diffuser layer A, two or more diffuser layers B, and optionally a diffusing agent-free layer C, the diffuser layer A containing 100 parts by weight of a first matrix plastic and from 0.2 to 1.5 parts by weight of a first light-diffusing fine particle having an average particle size of from 2 to 6 µm and a refractive index of from X−0.02 to X+0.02 wherein X is a refractive index of the first matrix plastic, the diffuser layer B containing 100 parts by weight of a second matrix plastic and from 10 to 30 parts by weight of a second light-diffusing fine particle having an average particle size of from 10 to 18 µm and a refractive index of from Y−0.03 to Y+0.03 wherein Y is a refractive index of the second matrix plastic, and two adjacent diffuser layers B being separated by an intervening diffuser layer A or diffusing agent-free layer C.

DETAILED DESCRIPTION OF THE INVENTION

Figure 1:
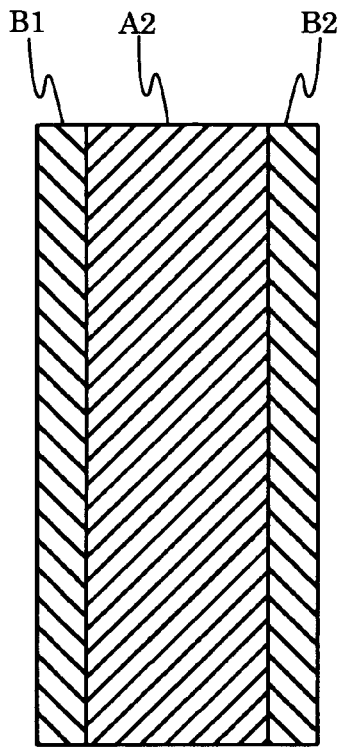
FIG. 1 is a schematic cross-sectional view showing a two-kind, three-layered plastic sheet.

The plastic sheet of the present invention includes two or more specific diffuser layers and has a thickness of from 1 to 5 mm, a haze of 80% or more, and a total light transmittance of 80% or more. With such two or more diffuser layers, a high light-diffusion effect and a sufficient reduction of scintillation can be attained while keeping the total light transmittance high.

A thickness of less than one millimeter is unfavorable, because the plastic sheet cannot stand by itself when mounted in a rear projection television set because of its poor strength. A thickness exceeding 5 mm is also unfavorable, because the weight of rear projection television set is increased. To meet the recent demand for wide-screen rear projection television sets, the thickness is preferably from 1 to 3 mm.

If the haze is less than 80%, a part of the projected light passes through the screen to unfavorably blur the images. If the total light transmittance is less than 80%, the image on the screen becomes dark. Namely, to attain a high light-diffusion effect and a sufficient reduction of scintillation, it would be ideal if both the total light transmittance and the haze of the plastic sheet are high. The haze is preferably 85% or more. The highest haze which can be industrially achieved is about 99%. Since it is preferred for the total light transmittance to be as high as possible, the value of haze is preferably about 88% or less when keeping the total light transmittance at a high level.

The plastic sheet of the invention includes at least one diffuser layer A and two or more diffuser layers B.

The diffuser layer A contains 100 parts by weight of a first matrix plastic and from 0.2 to 1.5 parts by weight of a first light-diffusing fine particle having an average particle size of from 2 to 6 µm. The refractive index of the first light-diffusing fine particle is from X−0.02 to X+0.02 wherein X is a refractive index of the first matrix plastic. The diffuser layer A serves to reduce the occurrence of scintillation. The first light-diffusing fine particle having an average particle size of from 2 to 6 µm is effective for reducing the occurrence of scintillation and preferred because of its low cost and easy availability. Examples of the first light-diffusing fine particle include, but not limited to, fine particles of cross-linked polymethyl methacrylate, fine particles of cross-linked polystyrene, and fine particles of cross-linked methyl methacrylate-styrene copolymer. The amount of the first light-diffusing fine particle in the diffuser layer A is from 0.2 to 1.5 parts by weight, preferably from 0.7 to 1.2 parts by weight based on 100 parts by weight of the first matrix plastic. If less than 0.2 part by weight, the effect of reducing the occurrence of scintillation is poor. If exceeding 1.5 parts by weight, the haze becomes excessively high to lower the luminance of screen. The diffuser layer A may contain, if necessary, antistatic agent, dye, lubricant, ultraviolet absorber, etc.

The diffuser layer B contains 100 parts by weight of a second matrix plastic and from 10 to 30 parts by weight of a second light-diffusing fine particle having an average particle size of from 10 to 18 µm. The refractive index of the second light-diffusing fine particle is from Y−0.03 to Y+0.03 wherein Y is a refractive index of the second matrix plastic. The diffuser layer B serves to reduce the occurrence of scintillation and visualize the projected images. To visualize and display images, the diffuser layer B has a high haze. To attain such a high haze, particles having an average particle size of from 10 to 18 μm are suitable as the second light-diffusing fine particle, also because of their low costs and easy availability. If less than 10 μm, a sufficiently high haze cannot be attained. If exceeding 18 μm, defects such as streak occur during the extrusion for the production of the plastic sheets. Examples of the second light-diffusing fine particle include, but not limited to, fine particles of cross-linked polymethyl methacrylate, fine particles of cross-linked polystyrene, and fine particles of cross-linked methyl methacrylate-styrene copolymer. The amount of the second light-diffusing fine particle in the diffuser layer B is from 10 to 30 parts by weight, preferably from 20 to 30 parts by weight based on 100 parts by weight of the second matrix plastic. If less than 10 parts by weight, the haze is low and the effect of reducing the occurrence of scintillation is insufficient. If exceeding 30 parts by weight, the haze is excessively high to lower the luminance of screen. The diffuser layer B may contain, if necessary, antistatic agent, dye, lubricant, ultraviolet absorber, etc. The average particle size referred to herein is a weight average particle size.

The plastic sheet of the present invention optionally includes a layer C containing no diffusing agent (diffusing agent-free layer C). The diffusing agent referred to herein includes the first light-diffusing fine particle, the second light-diffusing fine particle, and other fine particles which diffuse or scatter light. The diffusing agent-free layer C is made of a third matrix plastic and an optional additive such as ultraviolet absorber, antistatic agent, dye and pigment.

The plastic sheet of the present invention may further include a colored layer E made of a fourth matrix plastic and a dye or pigment. The colored layer E of blue, gray, violet, or another color is suitable for improving the contrast and controlling the color tone of displayed images. The dye or pigment is used in an amount such that the concentration is in a range of from 0.01 to 0.1% by weight based on the total weight of the plastic sheet. If less than 0.01% by weight, the contrast is not improved sufficiently. If exceeding 0.1% by weight, the image is excessively darkened for practical use. Examples of the dyes include, but not limited to, azo dyes, anthraquinone dyes, phthalocyanine dyes, quinoneimine dyes, nitro dyes and benzoquinone dyes. The colored layer E may further contain an additive such as ultraviolet absorber, antistatic agent and diffusing agent.

The first to fourth matrix plastics may be the same or different, and each matrix plastic is preferably at least one resin selected from the group consisting of polycarbonate, methyl methacrylate resin, polystyrene, methyl methacrylate-styrene copolymer and acrylonitrile-styrene copolymer, with methyl methacrylate-styrene copolymer and acrylonitrile-styrene copolymer being more preferred. The content of styrene units in methyl methacrylate-styrene copolymer and acrylonitrile-styrene copolymer is, but not limited to, preferably from 40 to 80% by weight, because a suitable rigidity, water absorption and impact resistance can be obtained.

Figure 2:
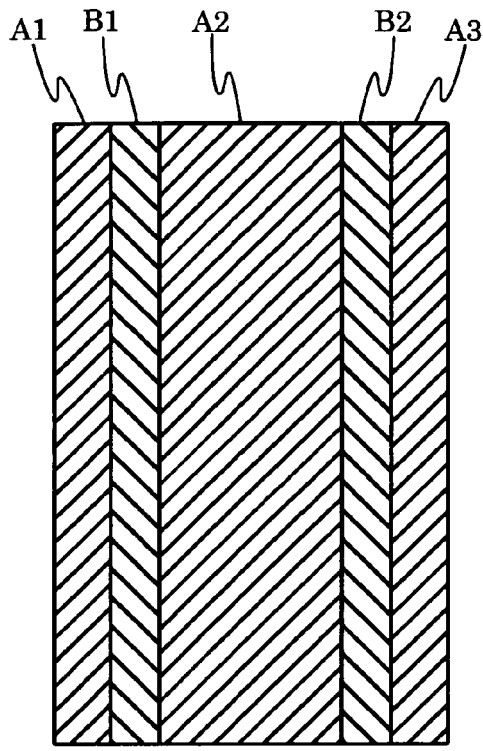
FIG. 2 is a schematic cross-sectional view showing a two-kind, five-layered plastic sheet.
Figure 3:
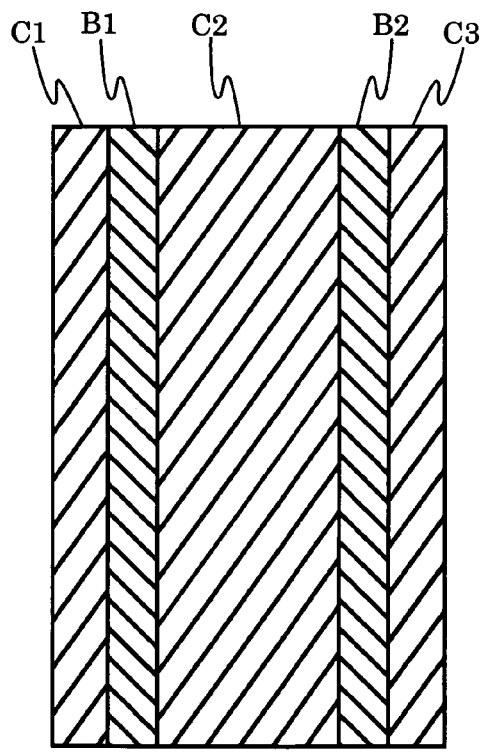
FIG. 3 is a schematic cross-sectional view showing a another two-kind, five-layered plastic sheet.
Figure 4:
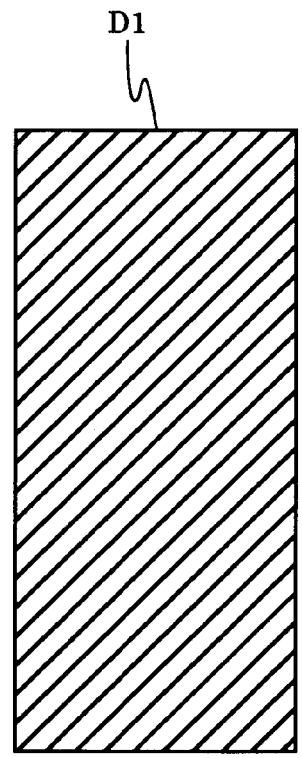
FIG. 4 is a schematic cross-sectional view showing a single-layered plastic sheet.

Preferred layered structures of plastic sheets of the present invention are schematically shown in the attached FIGS. 1 to 2 and 5 to 7 and those for comparative sheets are shown in FIGS. 3 and 4, in which A1, A2 and A3 correspond to the diffuser layer A, B1 and B2 to the diffuser layer B, C1, C2 and C3 to the diffusing agent-free layer C, and E1 and E3 to the colored layer E. FIG. 4 shows a single-layered sheet having only a diffuser layer D1 which is prepared in Comparative Example 3.

The plastic sheet of FIG. 1 has a two-kind, three-layered structure of B1/A2/B2. The plastic sheet of FIG. 2 has a two-kind, five-layered structure of A1/B1/A2/B2/A3, and the comparative plastic sheet of FIG. 3 has a two-kind, five-layered structure of C1/B1/C2/B2/C3 including no diffuser layer A. The plastic sheets of FIGS. 5 to 7 have three-kind, five-layered structures of C1/B1/A2/B2/C3, E1/B1/A2/B2/E3 and A1/B1/C2/B2/A3, respectively. As seen from FIGS. 1 to 2 and 5 to 7, two adjacent diffuser layers B are separated by the intervening diffuser layer A or diffusing agent-free layer C.

If the reduction of occurrence of scintillation is mainly taken into consideration, the two-kind, three-layered structure including one diffuser layer A and two diffuser layers B, as shown in FIG. 1, is basically preferred. The two-kind, three-layered structure has two outermost diffuser layers B which contain the second light-diffusing fine particle having a relatively large particle size in a relatively large amount. The second light-diffusing fine particle present near the surface roughens the surface of the plastic sheet. With such a roughened surface, the plastic sheet of the present invention exhibits a high effect on the reduction of occurrence of scintillation. The plastic sheet is used as the substrate of a lenticular lens sheet which is manufactured by bonding a lenticular lens film to the plastic sheet. The roughness of the surface of plastic sheet sometimes prevents a close adhesion between the plastic sheet and the lenticular lens film, to reduce the yield of products. If the close adhesion between the plastic sheet and the lenticular lens film is important, the two-kind, five-layered structure with its two outermost layers being the diffuser layers A is preferred, because a relatively small particle size of the first light-diffusing fine particle and its relatively small content in the diffuser layer A allows the surface of plastic sheet to be less roughened. Therefore, the close adhesion between the plastic sheet and the lenticular lens film can be attained by the two-kind, five-layered structure without causing any defect.

The plastic sheet of the invention includes at least one, preferably from 1 to 4 diffuser layers A. The diffuser layer A preferably intervenes between two adjacent diffuser layers B, and/or preferably forms either or both the outermost layers of the plastic sheet. The thickness is preferably from 0.05 to 0.3 mm if constituting outermost layer, and from 0.4 to 2 mm if constituting intermediate layer. If two or more diffuser layers A are used, the thicknesses may be the same or different.

The plastic sheet of the invention includes two or more, preferably from 2 to 3 diffuser layers B. The thickness of each diffuser layer B is preferably from 0.1 to 0.3 mm. If the thickness is regulated within the above range, the resolution is good and a layer having a uniform thickness can be produced because the variation in thickness is avoided. The interspace between two adjacent diffuser layers B is preferably from 0.5 to 2 mm and more preferably from 1 to 2 mm. With the interspace within the above range, a good resolution and a sufficient reduction of the occurrence of scintillation can be attained.

The plastic sheet of the invention includes, if used, preferably from 1 to 4 diffusing agent-free layers C. The diffusing agent-free layer C is preferably interposed between two adjacent diffuser layers B, and/or preferably forms either or both the outermost layers of the plastic sheet. The thickness is preferably from 0.05 to 0.3 mm if constituting outermost layer, and from 0.4 to 2 mm if constituting intermediate layer.

If two or more diffusing agent-free layers C are used, the thicknesses may be the same or different.

The plastic sheet of the invention includes, if used, preferably from 1 to 2 colored layers E. The colored layer E preferably forms either or both the outermost layers of the plastic sheet. The thickness is preferably from 0.05 to 0.3 mm. If two or more colored layers E are used, the thicknesses may be the same or different.

The plastic sheet of the invention is produced, for example, by a co-extrusion method, where the materials for each layer are mixed and introduced into each hopper of a screw extruder, each mixture is respectively melt-kneaded in the screw extruder, the melt-kneaded mixtures are co-extruded from respective T-dies into flat superposed layers, and then the superposed layers are allowed to pass through a pair of polishing rolls to make the surfaces smooth.

The plastic sheet of the invention is used, for example, in the production of a lenticular sheet for rear projection television. The screen of rear projection television is generally composed of a Fresnel lens sheet, a lenticular lens sheet and a front panel in this order from a light source. The lenticular lens sheet is a plastic sheet having, on its at least one surface, minute cylindrical lens arranged in parallel, serving to diffuse light in one of the horizontal direction and the vertical direction. The thickness is generally from about 0.5 to about 2 mm. The lenticular lens sheet is produced, for example, by forming lenticular lenses on the surface of the extruded plastic sheet by using a metal emboss roll, or by laminating the plastic sheet with a lenticulated film. The Fresnel lens sheet is produce, for example, by attaching Fresnel lens made of a UV-curable resin, etc. onto the surface of the plastic sheet, or by laminating the plastic sheet with a film having Fresnel lens formed on its surface. The Fresnel lens is composed of a concentric series of ring lenses, serving to focus light. The front panel is used for protecting the lenticular lens sheet, and generally made of a hard-coated plastic sheet.

The present invention will be explained in more detail by reference to the following example which should not be construed to limit the scope of the present invention.

The plastic sheets and the lenticular lens sheets were evaluated by the following methods.

(1) Refractive Index of Matrix Plastic

Measured according to the method of JIS K7142.

(2) Average Particle Size of Fine Particles

Measured according to the method of JIS Z8823.

(3) Refractive Index of Fine Particles

Measured by an immersion method in which fine particles were immersed in liquids having different refractive indices and Becke line was microscopically observed to determine the refractive index of the fine particles (Japanese Patent 2667878).

(4) Haze and Total Light Transmittance

Measured according to the method of JIS K7105 using a haze meter COH-300A manufactured by Nippon Denshoku Industries Co., Ltd.

(5) Scintillation of Lenticular Lens Sheet

The screen of a commercially available rear projection television set was replaced by a screen composed of a Fresnel lens sheet, a lenticular lens sheet prepared in each example and a front panel in this order from the light source. The scintillation in the images displayed by the rear projection television set was visually evaluated, because it was difficult to numerically evaluate the scintillation and it was more important to evaluate the scintillation by the degree of uncomfortable feeling actually perceived by human eyes. The results were evaluated according to the following ratings.

A: Substantially no scintillation was perceived.

B: Weak scintillation was perceived.

C: Strong scintillation was perceived.

EXAMPLE 1

By a co-extrusion method, a two-kind, five-layered plastic sheet composed of the diffuser layers A1, A2 and A3 and the diffuser layers B1 and B2 having a layered structure shown in FIG. 2 was produced.

Each of the layers A1, A2 and A3 was formed from 100 parts by weight of pellets of a methyl methacrylate-styrene copolymer (MMA-ST copolymer) and 1.5 parts by weight of fine particles of a cross-linked methyl methacrylate-styrene copolymer Ia (MMA-ST fine particle Ia).

MMA-ST copolymer: produced by copolymerizing a monomer mixture of 60% by weight of methyl methacrylate and 40% by weight of styrene, having a weight average molecular weight of 150,000 and a refractive index of 1.53.

MMA-ST fine particle Ia: having an average particle size of 6 μm and a refractive index of 1.54.

Each of the layers B1 and B2 was formed from 100 parts by weight of the MMA-ST copolymer and 25 parts by weight of fine particles of a cross-linked methyl methacrylate-styrene copolymer II (MMA-ST fine particle II).

MMA-ST fine particle II: having an average particle size of 12 μm and a refractive index of 1.55.

The overall thickness of the plastic sheet was 2.0 mm and the thickness of each layer was about 0.1 mm for the layers A1 and A3, about 1.4 mm for the layer A2, and about 0.2 mm for the layers B1 and B2. The measured haze and total light transmittance of the plastic sheet are shown in Table 1. After laminating a lenticular lens film onto the plastic sheet, the degree of scintillation was evaluated, the result thereof being shown in Table 1.

EXAMPLE 2

By a co-extrusion method, a two-kind, five-layered plastic sheet composed of the diffuser layers A1, A2 and A3 and the diffuser layers B1 and B2 having a layered structure shown in FIG. 2 was produced.

Each of the layers A1, A2 and A3 was formed from 100 parts by weight of the MMA-ST copolymer and 1.0 part by weight of fine particles of a cross-linked methyl methacrylate-styrene copolymer Ib (MMA-ST fine particle Ib).

MMA-ST fine particle Ib: having an average particle size of 6 μm and a refractive index of 1.55.

Each of the layers B1 and B2 was formed from 100 parts by weight of the MMA-ST copolymer and 25 parts by weight of the MMA-ST fine particle II.

The overall thickness of the plastic sheet was 2.0 mm and the thickness of each layer was about 0.1 mm for the layers A1 and A3, about 1.4 mm for the layer A2, and about 0.2 mm for the layers B1 and B2. The measured haze and total light transmittance of the plastic sheet are shown in Table 1. After laminating a lenticular lens film onto the plastic sheet, the degree of scintillation was evaluated, the result thereof being shown in Table 1.

Comparative Example 1

By a co-extrusion method, a two-kind, five-layered plastic sheet composed of the diffusing agent-free layers C1, C2 and C3 and the diffuser layers B1 and B2 having a layered structure shown in FIG. 3 was produced.

Each of the layers C1, C2 and C3 was formed from only the MMA-ST copolymer. Each of the layers B1 and B2 was formed from 100 parts by weight of the MMA-ST copolymer and 25 parts by weight of the MMA-ST fine particle II.

The overall thickness of the plastic sheet was 2.0 mm and the thickness of each layer was about 0.1 mm for the layers C1 and C3, about 1.4 mm for the layer C2, and about 0.2 mm for the layers B1 and B2. The measured haze and total light transmittance of the plastic sheet are shown in Table 1. After laminating a lenticular lens film onto the plastic sheet, the degree of scintillation was evaluated, the result thereof being shown in Table 1.

Comparative Example 2

By a co-extrusion method, a two-kind, five-layered plastic sheet composed of the diffuser layers A1, A2 and A3 and the diffuser layers B1 and B2 having a layered structure shown in FIG. 2 was produced.

Each of the layers A1, A2 and A3 was formed from 100 parts by weight of the MMA-ST copolymer and 0.5 part by weight of fine particles of a cross-linked methyl methacrylate-styrene copolymer Ic (MMA-ST fine particle Ic).

MMA-ST fine particle Ic: having an average particle size of 6 μm and a refractive index of 1.57.

Each of the layers B1 and B2 was formed from 100 parts by weight of the MMA-ST copolymer and 25 parts by weight of the MMA-ST fine particle II.

The overall thickness of the plastic sheet was 2.0 mm and the thickness of each layer was about 0.1 mm for the layers A1 and A3, about 1.4 mm for the layer A2, and about 0.2 mm for the layers B1 and B2. The measured haze and total light transmittance of the plastic sheet are shown in Table 1. After laminating a lenticular lens film onto the plastic sheet, the degree of scintillation was evaluated, the result thereof being shown in Table 1.

Comparative Example 3

By an extrusion method, a single-layered plastic sheet composed of only one diffuser layer D1 shown in FIG. 4 was produced. The layer D1 was formed from 100 parts by weight of the MMA-ST copolymer and 3.0 parts by weight of the MMA-ST fine particle II. The thickness was about 2.0 mm. The measured haze and total light transmittance of the plastic sheet are shown in Table 1. After laminating a lenticular lens film onto the plastic sheet, the degree of scintillation was evaluated, the result thereof being shown in Table 1.

EXAMPLE 3

Figure 5:
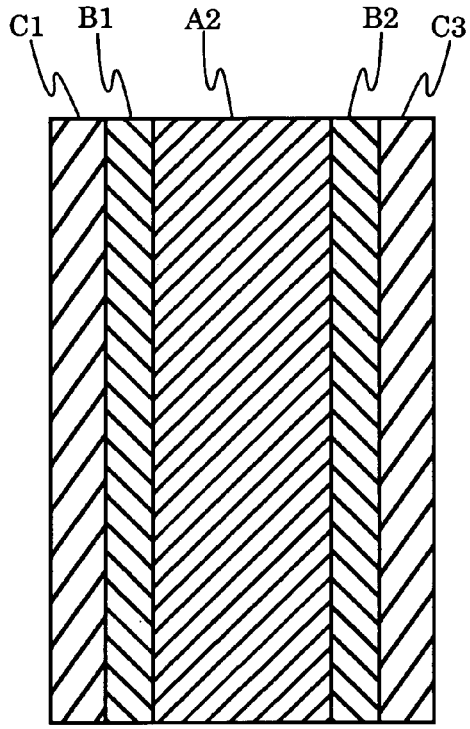
FIG. 5 is a schematic cross-sectional view showing a three-kind, five-layered plastic sheet.

By a co-extrusion method, a three-kind, five-layered plastic sheet composed of the diffusing agent-free layers C1 and C3, the diffuser layers B1 and B2 and the diffuser layer A2 having a layered structure shown in FIG. 5 was produced.

Each of the layers C1 and C3 was formed from only the MMA-ST copolymer. Each of the layers B1 and B2 was formed from 100 parts by weight of the MMA-ST copolymer and 25 parts by weight of the MMA-ST fine particle II. The layer A2 was formed from 100 parts by weight of the MMA-ST copolymer and 1.0 part by weight of the MMA-ST fine particle Ib.

The overall thickness of the plastic sheet was 2.0 mm and the thickness of each layer was about 0.1 mm for the layers C1 and C3, about 1.4 mm for the layer A2, and about 0.2 mm for the layers B1 and B2. The measured haze and total light transmittance of the plastic sheet are shown in Table 1. After laminating a lenticular lens film onto the plastic sheet, the degree of scintillation was evaluated, the result thereof being shown in Table 1.

EXAMPLE 4

Figure 6:
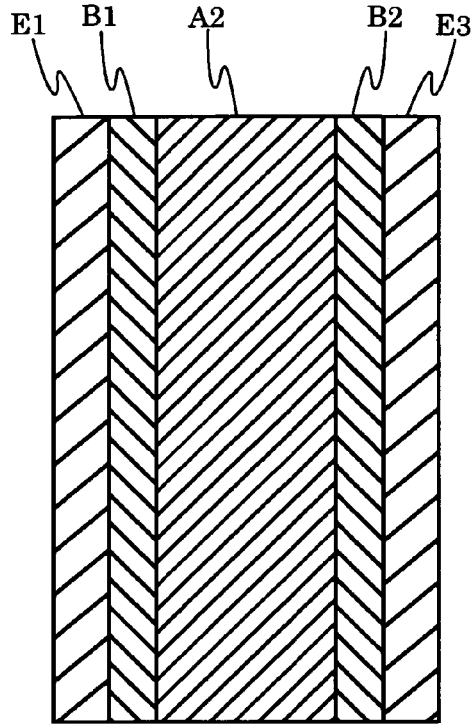
FIG. 6 is a schematic cross-sectional view showing a another three-kind, five-layered plastic sheet.

By a co-extrusion method, a three-kind, five-layered plastic sheet composed of the colored layers E1 and E3, the diffuser layers B1 and B2 and the diffuser layer A2 having a layered structure shown in FIG. 6 was produced.

Each of the layers E1 and E3 was formed from 100 parts by weight of the MMA-ST copolymer and 0.5 part by weight of a gray dye. Each of the layers B1 and B2 was formed from 100 parts by weight of the MMA-ST copolymer and 25 parts by weight of the MMA-ST fine particle II. The layer A2 was formed from 100 parts by weight of the MMA-ST copolymer and 1.0 part by weight of the MMA-ST fine particle Ib.

The overall thickness of the plastic sheet was 2.0 mm and the thickness of each layer was about 0.1 mm for the layers E1 and E3, about 1.4 mm for the layer A2, and about 0.2 mm for the layers B1 and B2. The measured haze and total light transmittance of the plastic sheet are shown in Table 1. After laminating a lenticular lens film onto the plastic sheet, the degree of scintillation was evaluated, the result thereof being shown in Table 1.

EXAMPLE 5

Figure 7:
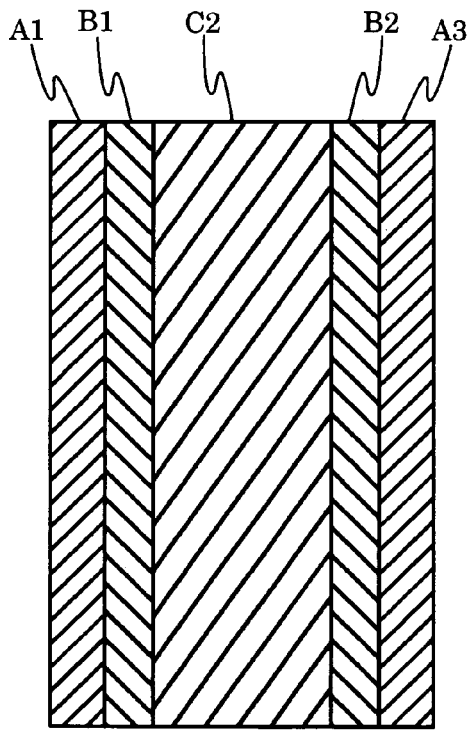
FIG. 7 is a schematic cross-sectional view showing a still another three-kind, five-layered plastic sheet.

By a co-extrusion method, a three-kind, five-layered plastic sheet composed of the diffuser layers A1 and A3, the diffuser layers B1 and B2 and the diffusing agent-free layer C2 having a layered structure shown in FIG. 7 was produced.

Each of the layers A1 and A3 was formed from 100 parts by weight of the MMA-ST copolymer and 1.5 parts by weight of the MMA-ST fine particle Ib. Each of the layers B1 and B2 was formed from 100 parts by weight of the MMA-ST copolymer and 26 parts by weight of the MMA-ST fine particle II. The layer C2 was formed from only the MMA-ST copolymer.

The overall thickness of the plastic sheet was 2.0 mm and the thickness of each layer was about 0.1 mm for the layers A1 and A3, about 0.2 mm for the layers B1 and B2, and about 1.4 mm for the layer C2. The measured haze and total light transmittance of the plastic sheet are shown in Table 1. After laminating a lenticular lens film onto the plastic sheet, the degree of scintillation was evaluated, the result thereof being shown in Table 1.

TABLE 1

| | Haze (%) | Total light transmittance (%) | Evaluation of scintillation |
| --- | --- | --- | --- |
| Example | | | |
| 1 | 88 | 92 | A |
| 2 | 87 | 92 | A |
| 3 | 87 | 92 | A |
| 4 | 88 | 84 | A |
| 5 | 88 | 92 | A |
| Comparative Examples | | | |
| 1 | 87 | 92 | C |
| 2 | 88 | 92 | B |
| 3 | 85 | 92 | C |

By using the plastic sheet of the present invention, rear projection television sets which display good images with little scintillation can be provided. The plastic sheet of the present invention is also suitable in application fields where a high light-diffusion and a high anti-glare are required.

What is claimed is:

1. A plastic sheet having a thickness of from 1 to 5 mm, a haze of 80% or more and a total light transmittance of 80% or more, which comprises a three-layered sheet having a layered structure of diffuser layer B/diffuser layer A/diffuser layer B, or a five-layered sheet having a layered structure of diffuser layer A/diffuser layer B/diffuser layer A/diffuser layer B/diffuser layer A, the diffuser layer A comprising 100 parts by weight of a first matrix plastic and from 0.2 to 1.5 parts by weight of a first light-diffusing fine particle having an average particle size of from 2 to 6 μm and a refractive index of from X−0.02 to X+0.02 wherein X is a refractive index of the first matrix plastic;

the diffuser layer B comprising 100 parts by weight of a second matrix plastic and from 10 to 30 parts by weight of a second light-diffusing fine particle having an average particle size of from 10 to 18 μm and a refractive index of from Y−0.03 to Y+0.03 wherein Y is a refractive index of the second matrix plastic.

2. The plastic sheet according to claim 1, wherein the first matrix plastic and the second matrix plastic are each at least one resin independently selected from the group consisting of polycarbonate, methyl methacrylate resin, polystyrene, methyl methacrylate-styrene copolymer and acrylonitrile-styrene copolymer.

3. The plastic sheet according to claim 1, wherein each of the diffuser layers B has a thickness of from 0.1 to 0.3 mm.

4. The plastic sheet according to claim 1, wherein an interspace between two adjacent diffuser layers B is from 0.5 to 2.0 mm.

5. The plastic sheet according to claim 1, which is a five-layered sheet having a layered structure of diffusing agent-free layer C/diffuser layer B/diffuser layer A/diffuser layer B/diffusing agent-free layer C.

6. The plastic sheet according to claim 1, which further comprises a colored layer E comprising a matrix plastic and a dye or pigment.

7. The plastic sheet according to claim 6, which is a five-layered sheet having a layered structure of colored layer E/diffuser layer B/diffuser layer A/diffuser layer B/colored layer E.

8. The plastic sheet according to claim 1, which is produced by a T-die co-extrusion method.

9. The plastic sheet according to claim 1, consisting of said three-layered sheet or said five-layered sheet.

10. The plastic sheet according to claim 1, wherein each of the first and second light-diffusing fine particles is made of a material selected from the group consisting of cross-linked polymethyl methacrylate, cross-linked polystyrene and cross-linked methyl methacrylate-styrene copolymer.

11. The plastic sheet according to claim 1, consisting of said three-layered sheet.

12. The plastic sheet according to claim 1, having a haze of 80%-88%.

13. The plastic sheet according to claim 12, having a haze of 85%-88%.

14. The plastic sheet according to claim 1, consisting of said five-layered sheet.

* * * * *